United States Patent
Ortlam

(10) Patent No.: US 8,191,110 B2
(45) Date of Patent: May 29, 2012

(54) DATA PROCESSING NETWORK AND METHOD FOR OPERATING A DATA PROCESSING NETWORK

(75) Inventor: Dieter Ortlam, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 728 days.

(21) Appl. No.: 12/318,440

(22) Filed: Dec. 30, 2008

(65) Prior Publication Data

US 2009/0183232 A1 Jul. 16, 2009

(30) Foreign Application Priority Data

Jan. 16, 2008 (DE) .......................... 10 2008 004 657

(51) Int. Cl.
*G06F 7/04* (2006.01)
*G06F 21/00* (2006.01)
(52) U.S. Cl. .................. 726/3; 726/9; 726/27; 713/185
(58) Field of Classification Search ................ 726/2–10, 726/16–21, 26–30; 713/182–186, 189; 340/5.28, 340/5.8–5.85
See application file for complete search history.

(56) References Cited

U.S. PATENT DOCUMENTS

| | | | |
|---|---|---|---|
| 6,400,272 B1 | 6/2002 | Holtzman et al. | |
| 2002/0069364 A1 | 6/2002 | Dosch | |
| 2003/0182586 A1* | 9/2003 | Numano | 713/202 |
| 2004/0236699 A1* | 11/2004 | Beenau et al. | 705/64 |
| 2005/0091338 A1* | 4/2005 | de la Huerga | 709/217 |
| 2007/0283431 A1* | 12/2007 | Ueda | 726/19 |
| 2008/0052765 A1* | 2/2008 | Shinomiya et al. | 726/3 |
| 2008/0109895 A1* | 5/2008 | Janevski | 726/19 |
| 2009/0109030 A1* | 4/2009 | Do et al. | 340/572.1 |

FOREIGN PATENT DOCUMENTS

| | | |
|---|---|---|
| DE | 198 12 908 | 9/1999 |
| DE | 199 32 147 | 1/2001 |
| DE | 102 51 906 | 5/2004 |
| DE | 10 2004 016 654 | 10/2005 |
| WO | WO 2006/039119 | 4/2006 |
| WO | WO 2006/058415 | 6/2006 |

\* cited by examiner

*Primary Examiner* — Kim Vu
*Assistant Examiner* — Darren B Schwartz
(74) *Attorney, Agent, or Firm* — Harness, Dickey & Pierce, P.L.C.

(57) ABSTRACT

During operation of a data processing network, including a number of individual devices enabling user access, an identification object that can be carried by a user of the data processing network exchanges data in a wireless fashion with an access control device connected to an individual device, as soon as the identification object is sufficiently close to the access control device. In at least one embodiment, the user is allowed access to the data processing network as a function of data stored on the identification object and transmitted to the individual device. If a second identification object approaches the access control device, the different identification objects are assigned different usage rights as a function of the time that has elapsed between the detection of the identification objects by the access control device.

19 Claims, 2 Drawing Sheets

DATA PROCESSING NETWORK AND METHOD FOR OPERATING A DATA PROCESSING NETWORK

PRIORITY STATEMENT

The present application hereby claims priority under 35 U.S.C. §119 on German patent application number DE 10 2008 004 657.4 filed Jan. 16, 2008, the entire contents of which is hereby incorporated herein by reference.

FIELD

Embodiments of the invention generally relate to a method for organizing access to a data processing network that can be used in particular in a medical engineering environment and/or an apparatus that is suitable for implementing the method.

BACKGROUND

An Internet terminal with an identification module, which can be an RFID-technology-based transponder that can be read out in a contactless fashion, is known from US 2002/0069364 A1.

A network system and a method for controlling access by a first network component to at least one second network component is known from DE 10 2004 016 654 B4. The known network system is intended to have a high degree of flexibility with the greatest possible access security, with no specialization in respect of a specific field of application being defined. The method known from DE 10 2004 016 654 B4 operates for example with a user identification determined by calculation.

In medical engineering, in particular in the field of radiology, data processing facilities are typically operated alternately by different users. Generally each user requiring access to a data processing facility has to log in to said facility by inputting a user name and a password. However when a number of individual devices of a data processing system are provided for a group of users and there are frequent changes of user, such logging in or identification represents a quite significantly time-consuming process. To reduce the considerable time required in total for login procedures, it would in principle be possible to make a data processing system available for a group of users, without requiring every user to log in individually. However such a mode of operation is not recommended because of security aspects.

SUMMARY

In at least one embodiment of the invention organizes the operation of a data processing network, which is used regularly by a number of users, who access interrelated groups of individual devices of the data processing network, in a particularly rational fashion and at the same time to take security aspects sufficiently into consideration.

According to at least one embodiment of the invention, a method is disclosed for operating a data processing network and by an apparatus is disclosed, namely a data processing network, which is set up to implement the method of at least one embodiment, in particular by software methods/devices. Embodiments and advantages of the inventive method described below also apply accordingly to the data processing network and vice versa. The data processing network is suitable in particular for processing medical engineering data. Medical engineering data includes for example image data obtained using diagnostic imaging devices such as computed tomography or magnetic resonance devices.

The method of at least one embodiment assumes that a data processing network is provided, which comprises a number of individual devices, each enabling user access, in particular computers that can operate separately. Each user of the data processing network can carry an identification object, which can be used to obtain access to the data processing network. The identification object exchanges data wirelessly with an access control device connected to the individual device, as soon as the identification object is sufficiently close to the access control device, in other words as soon as the identification object is in detection range of the access control device. If the mobile identification object is detected by way of the access control device, the user is automatically allowed access to the data processing network as a function of data stored on the identification object and transmitted to the individual device by way of the access control device.

If a second identification object approaches the access control device, the different identification objects are automatically assigned different usage rights as a function of the time that has elapsed between the detection of the identification objects by the access control device.

An RFID chip (Radio Frequency Identification) is preferably used as the identification object. The use of RFIDs in data processing and communication systems is known in principle for example from the publications DE 102 51 906 B4 and DE 198 12 908 A1, which relate to inventory systems. In the present instance the identification objects can essentially either be RFIDs with their own energy supply or RFIDs without their own energy supply. The last-mentioned RFIDs draw the energy required for their operation solely from electromagnetic energy radiated in from outside, namely from a read-out unit. Regardless of the nature of the RFIDs used, in a preferred embodiment said RFIDs enable maintenance-free operation for at least one year. A high level of user-friendliness results from the fact that an RFID only has a very small space requirement and can be carried easily for example in a garment pocket or on an armband or wristband. In general the portable identification object is also referred to as a token.

According to one advantageous development the identification object carried by the user also automatically uploads a user profile of the respective user as well as allowing access to the data processing network. The user therefore does not have to carry out any manual inputs, for example keyboard inputs, either for the login procedure or to upload his/her user profile. Instead the said processes of logging in and uploading user-specific data are triggered completely and automatically by the identification object identifying the user being brought into range of the access control device, which interacts in a contactless fashion with the identification object. In the clinical field in particular the wireless transmission of data between the identification object and the access control device is particularly advantageous from a hygiene point of view. The radius measured out from the access control device, within which the identification object has to be positioned in order to trigger the automatic login process and optionally also the uploading of the user profile, can for example be several tens of cm (e.g. 30 cm) or around a meter.

During operation of the data processing network in an example embodiment there is automatic direct or indirect monitoring of whether the authorized user, in other words the user carrying the identification object detected by way of the access control device, moves out of the detection range of the access control device, as defined by the above-mentioned radius.

According to the direct monitoring method of at least one embodiment the time elapsing after removal of the previously detected identification object from the detection range of the access control device is measured automatically. After a fixed or adjustable first time interval has been exceeded, during which the identification object was removed from the detection range of the access control device, the operating mode of the individual device protected by way of the access control device preferably switches first to a wait mode. In this mode the current screen display disappears, with the data processing process being held or as it were "frozen" in its current status. If the user, together with identification object, re-enters the detection range of the access control device, said user can continue work without further action at the point where he/she broke off to leave the detection range. However if a further user tries to obtain access to the individual device, which is in wait mode, this is not possible or it is at least not possible without further steps. Depending on the settings of the data processing network provision can be made for example for a second user generally not to be granted access to an individual device being operating in wait mode. Alternatively in such an instance access can be provided for example only by demonstrating a specific authorization and/or after release by the first user, who is already logged in.

In contrast to the direct monitoring method described above, which takes into account at least rough location information, a particularly advantageous indirect monitoring method is based on measuring the time periods, during which the user makes no input, either with a keyboard or mouse. Such a time period, during which no user activity can be ascertained by way of the individual device of the data processing network, is referred to as activity pause time or activity idle time, idle time for short. The indirect monitoring method is characterized in particular in that only an initial recognition of the identification object is required. As with the direct monitoring method, according to the indirect monitoring method time intervals can also be predetermined or adjustable, after the end of which certain steps are carried out automatically, for example the individual device operated by the user switches to wait mode. Given the analogy between the direct and indirect monitoring methods, the description which follows relates, as far as is applicable, to both monitoring methods.

If, after the removal of the identification object from the detection range of the access control device or after the time of the last detected user activity, a second time interval is exceeded, which goes beyond the first time interval described above, the user is automatically logged off from his/her ongoing session according to a preferred, in particular security-based method schedule, with data being automatically backed up. To continue work, the user would then have to log in again, which can be done with the aid of the identification object at any individual device.

In particular in cases where the detection range of the access control device extends beyond the range of a few centimeters, there is a significant probability that a number of identification objects will be present at the same time in the detection range of the access control device and therefore of an individual device of the data processing network. In such a case the individual identification objects and therefore the usage rights to be assigned to different users are automatically assigned according to predefined prioritization rules in an advantageous embodiment. The prioritization rules can hereby be set permanently or can be varied by the user.

According to one possible prioritization rule it is for example specified that if an identification object is registered, which is detected by the same access control device in addition to an already previously registered identification object, an option function is automatically generated and can be displayed to the user. The nature of the option function itself and/or the nature of the option defined is preferably a function of the time interval between detection of the first identification object by the access control device and detection of the second identification object by the same access control device, it being possible for provision to be made for the user to be able to set the time interval.

If the time interval is less than the time interval mentioned, in other words the limit value for the time interval between detection of the different identification objects in the detection range of the access control device, according to a preferred embodiment an option menu is automatically displayed, showing the data assigned to the two identification objects that has to be displayed to the user in a similar fashion. In other words, the information intended for the different users, each carrying an identification object, is presented together in an equivalent fashion. It is assumed here that the approximately simultaneous detection of different identification objects by a single access control device generally does not occur randomly but is for example the result of two people, each carrying an identification object, entering the room in which the access control device is installed together. In such an instance it would not be appropriate to give one of the identification objects higher priority than the second identification object in respect of access to the data processing device connected to the access control device.

A different instance occurs when a longer time period, which exceeds the above-mentioned limit value, elapses between detection of the first identification object and detection of the second identification object, in particular if the access procedure with the first identification object has already been completed. In this instance, in contrast to the instance described above, a prioritization that can be recognized by the user takes place, with the data assigned to the last detected identification object being displayed in a secondary fashion. In an example embodiment this happens in such a fashion that the user obtaining access to the data processing network with the aid of the first identification object receives a message that a further user—or more precisely a further identification object—is within the detection range of the access control device. This message is displayed on the monitor used by the first user where possible in such a fashion that the functionality of the ongoing application is not impaired in practice. At the same time it is possible to grant the second user access to the data processing network, it being possible for the first user to remain logged in or to log off.

In an example embodiment of the data processing system there is no use of technical devices, which serve to detect the presence of persons in specific volume regions. Rather the methods described above, which take account at least in an indirect fashion of both the location of an identification object and the time period, in which the identification object can be recognized or user activity continues in an essentially uninterrupted fashion, are characterized in particular by their low outlay in respect of apparatus.

An advantage of at least one embodiment of the invention is that users of a data processing network, which is deployed preferably in the health sector, in particular in a clinic, have fast and reliable access to individual devices of the data processing network and therefore as required to the data processing network as a whole with the aid of an identification object that is carried by the user and can be read out in a contactless fashion and is preferably configured as an RFID token.

BRIEF DESCRIPTION OF THE DRAWINGS

An example embodiment of the invention is described in more detail below with reference to a drawing, in which.

DETAILED DESCRIPTION OF THE EXAMPLE EMBODIMENTS

Figure 1:
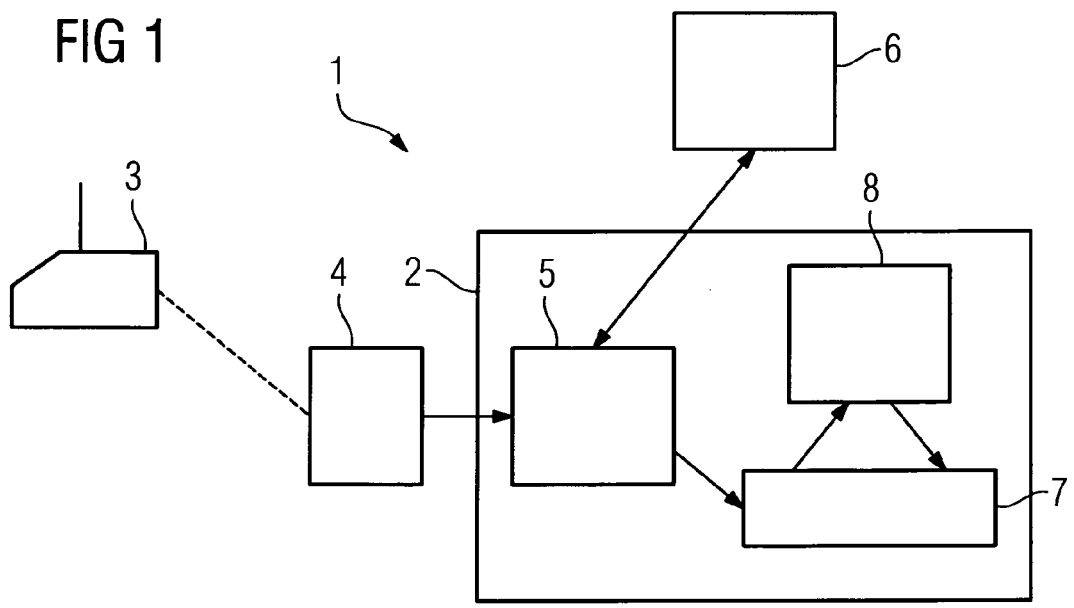
FIG. 1 shows a data processing network, which is provided for use in a clinic.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

A data processing network 1 shown in rough outline in FIG. 1 comprises individual devices 2 provided to process medical engineering data, for example two-dimensional or three-dimensional image data, only one of said devices being shown. The individual devices 2 are for example computers that can be operated individually, each equipped with keyboard and screen. The individual device 2 outlined in block form in FIG. 1 can be connected directly or indirectly to a modality such as a computed tomograph or a magnetic resonance tomograph or can be part of such an imaging modality.

A user, for example a physician, who is authorized to use the data processing network 1, carries an identification object 3, namely an RFID token, in or on their clothing. This identification object 3 is able to exchange data with an access control device 4 in a contactless manner, as shown with a broken line in FIG. 1, said access control device 4 being connected to the individual device 2 or being an integral component of the individual device 2.

The access control device 4 reads data out of the identification object 3, once it is located, according to the arrangement in FIG. 1, within the detection range of the access control device 4. The identification object 3 does not have to have its own energy supply, for example a battery, for the reading out process. In individual instances however it may be expedient to provide it with its own energy source, for example to provide additional functions of the identification object 3. In any case the data transfer between the identification object 3 and the access control device 4 takes place in a contactless fashion.

The user-specific data received by the access control device 4 is routed to an authentication component 5, which is part of the individual device 2, but does not necessarily have to be arranged physically—as shown in FIG. 1—with further components of the individual device 2 in a shared apparatus. Generally the components of the data processing network 1 visible in FIG. 1 should be understood simply as logical function elements, which can be realized for example by way of software.

The authentication component 5 sends an authorization request to a function module 6, which in the example embodiment in FIG. 1 is not to be assigned to the individual device 2 but is provided centrally, as a component of a data processing system (not shown in detail). If the authorization of the user, who has identified themselves by way of the identification object 3, is confirmed with the aid of the function module 6, the authentication component 5 sends a corresponding message to a device module 7, which should be assigned to the individual device 2. If not, in other words if there is no access authorization, a corresponding notification can likewise be generated, which can be displayed on a monitor of the individual device 2 and/or at another point of the data processing network 1.

The device module 7 is connected for data purposes to an application module 8, which enables the actual data processing process requested by the user, for example the processing of diagnostic image data. User management, as far as it affects the individual device 2, is however provided by the device module 7.

Individual steps of the method which can be implemented using the device according to FIG. 1, which also show aspects of user management, are described below with reference to FIGS. 2 and 3.

In a first step S1 (FIG. 2) the identification object 3 is moved so close to the access control device 4 that it can be detected by it. This means that the user carrying the identification object 3 passes into the detection range of the access control device 4, which has a radius of approximately 1 m for example. Both the process and the time of detection of the identification object 3 are registered in step S2 by components of the data processing networks 1, which are provided for this purpose and have already been described above, with the user being granted access to the data processing network 1 in the desired manner. Maximum user-friendliness is achieved in that there is no need to input either a user name or password and, the user profile associated with the identification object 3 is uploaded automatically without any input on the part of the user.

In step S3 the user and the identification object 3 leave the detection space. The time of this process is registered first, without having any influence on the ongoing data processing process. As an alternative to monitoring in an ongoing fashion or at interval's whether the wireless data transfer between the identification object 3 and the access control device 4 can still be maintained, in other words the identification object 3 is still in detection range, according to a particularly preferred variant of the method, which can be achieved with less outlay, only the activity idle time is monitored after initial detection of the identification object 3.

At a later time the user tries to continue the data processing process in step S4. The data processing status is hereby a function of time elapsed, in other words the time in which the identification object 3 has been outside the detection space, or the measured activity idle time.

As soon as a first time interval of for example several minutes has elapsed after the removal of the identification object 3 from the detection space or after the time of the last detected user activity, operation of the individual device 2 is switched to a so-called sleep or wait mode, in which in particular the previously displayed screen display is hidden so that third parties cannot have insight into the ongoing procedures. Also access by a third party to the keyboard or other input devices of the operating individual device 2 is blocked in wait mode. The time interval, after which wait mode is activated, is defined in each instance in the example embodiment in FIG. 2.

In a first sub-case, which results in step S5, the individual device 2 is still in wait mode, when the user once again moves into detection range with the identification object 3. The data processing process is then continued as if the identification object 3 had not been removed from detection range. Enhanced user-friendliness of the individual device 2 is thus combined with compliance with more stringent safety requirements.

In the second sub-case it is assumed that the maximum period set for wait mode has elapsed. In step S6 the user is then automatically logged off with the data being backed up at the same time, so that the individual device 2 is available for other users.

Figure 2:
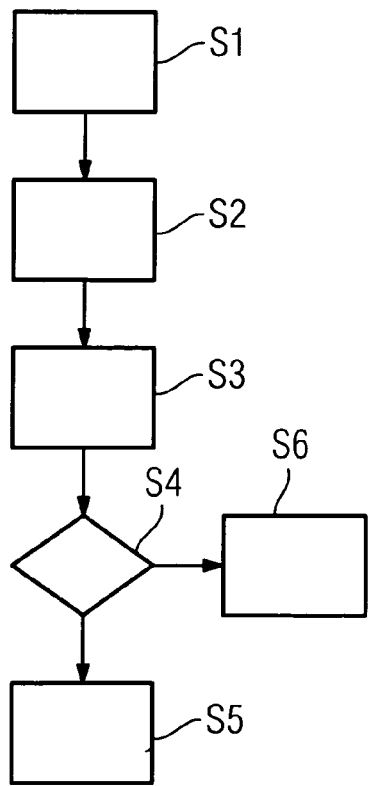
FIGS. 2, 3 respectively show flow diagrams of individual steps of methods that can be implemented with the data processing network and FIGS. 4, 5 respectively show screen displays that can be displayed in the data processing network, showing the possible options for selecting between different procedures.
Figure 3:
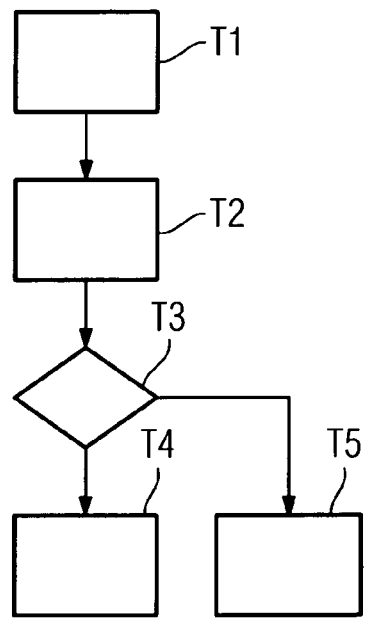

In the example embodiment according to FIG. 3 the individual steps are designated as T1 to T5 to distinguish them from those in the example embodiment in FIG. 2. In the first step T1 a first user of the individual device 2 has already logged in, with the time when the identification object 3 was first recognized in the detection space, in other words the time of initial recognition, being stored. The identification object 3 has been present in the detection space without interruption since this time. This is also assumed, as long as the new activity pause time, starting in each instance after termination of user activity, for example a keyboard input, does not exceed a fixed or variable limit value.

Figure 4:
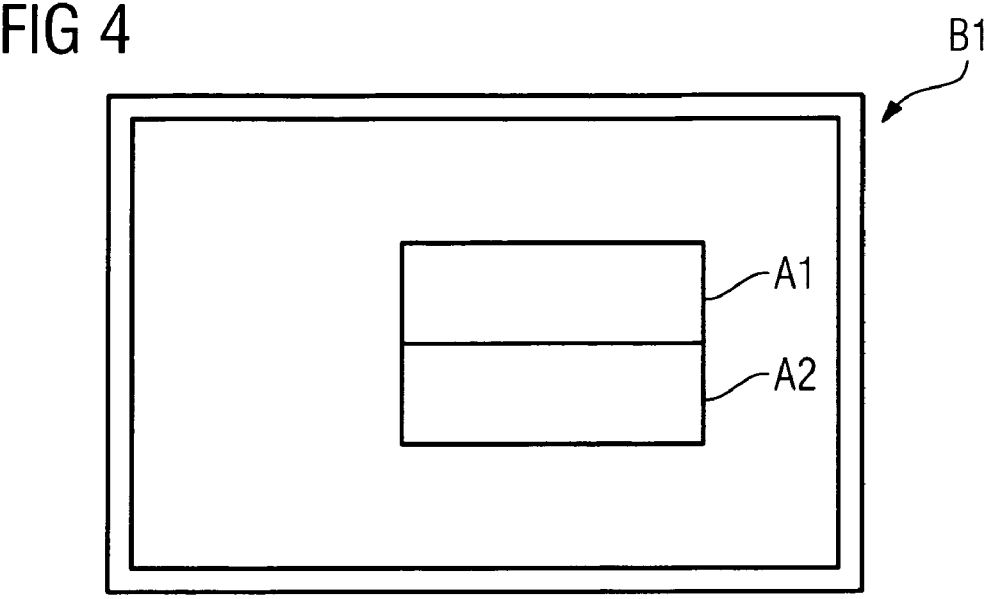

In step T2 a further user, likewise carrying an identification object 3, moves into the detection range of the access control device 4. In this instance too the earliest time of recognition of the identification object 3 is registered. The difference between the two registered times is calculated automatically and compared with a preset time interval, which is required for a comparison operation in step T3:

If the measured time difference is less than the preset time interval of for example several seconds, it is as if the different identification objects 3 were detected simultaneously in the detection range, also referred to as the detection space. The equal ranking of both detection events is therefore assumed. An automatic login of just one user is not possible in this instance. Instead a specific user-controlled selection has to be made. To this end a screen display B1 is generated, as shown schematically in FIG. 4. The screen display B1 shows two display fields A1, A2, which are shown next to one another in the same size and therefore apparently having the same ranking. Selecting one of the display fields A1, A2 allows a specific user to be determined as the user of the individual device 2. The corresponding determination takes place in step T4.

Figure 5:
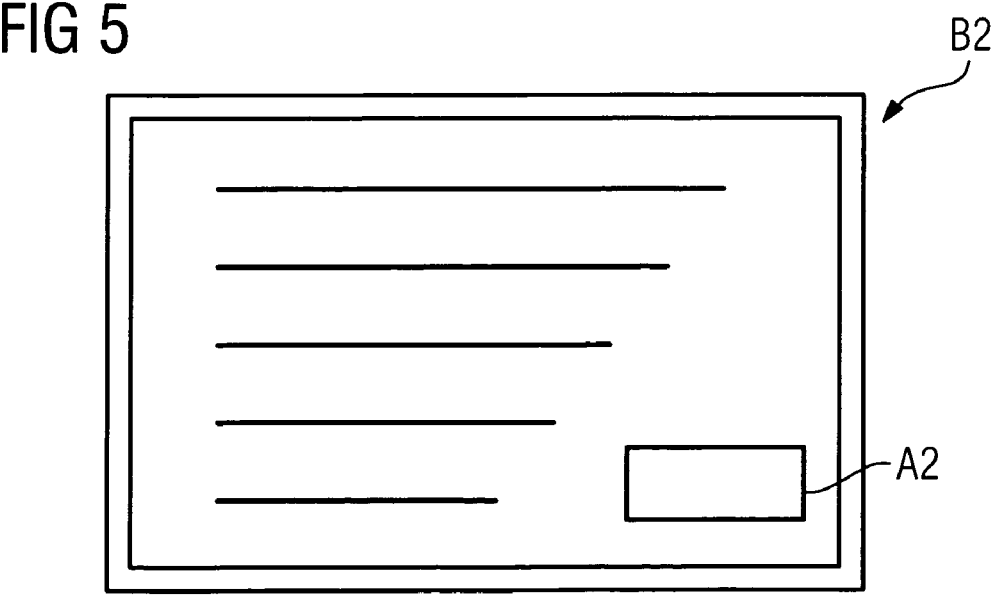

If in contrast to the instance ending up in T4 the measured time difference is so great that a purely random time offset between detection events cannot be assumed, one user is logged in automatically first, as shown in FIG. 2. The user is able to process data with the aid of an application program, with a possible screen display B2 being shown in FIG. 5. The second user, likewise carrying a valid identification object 3 that in principle enables access to the individual device 2, should where possible not hinder the work of the first user beyond the absolutely necessary degree. At the same time however it should be displayed to the first user that a further user with appropriate authorization is in principle a potential user of the individual device 2. To deal with these contrasting requirements, a relatively small display field A2 is inserted into the screen display B2, as shown in FIG. 5, indicating the presence of the second identification object 3 within the detection space A2 to the user currently using the individual device 2. The already logged in user is now able to refuse access by the second user, agree to a change of user or—depending on the software embodiment—to confirm the additional logging in of the second user. If no input follows on the part of the first user, it is assumed by default that the individual device 2 should continue to be assigned to the already logged in user alone. In this instance the display field A2, which is automatically positioned where possible on a part of the screen currently not being used, is hidden again after a time interval which can preferably be set as required.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

LIST OF REFERENCE CHARACTERS

1 Data processing network
2 Individual device
3 Identification object
4 Access control device
5 Authentication component
6 Function module
7 Device module
8 Application module
A1, A2 Display field
B1, B2 Screen display
S1, . . . S6 Step
T1, . . . T5 Step

What is claimed is:

1. A method for operating a data processing network including a plurality of individual devices, each enabling user access, the method comprising:
   permitting an identification object, carriable by a user of the data processing network, to exchange data in a wireless fashion with an access control device connected to at least one of the individual devices, upon the identification object being detected as being sufficiently close to the access control device;
   allowing the user access to the data processing network as a function of data stored on the identification object and transmitted, in the data exchange, to the one individual device;
   permitting a further identification object, of a further user of the data processing network detected by the access control device, to exchange data in a wireless fashion with the access control device, the identification object and further identification object being automatically assigned different usage rights as a function of an elapsed time between the detection of the identification object and the further identification object by the access control device;
   displaying, if a time interval is less than a time interval between a time of registration of the identification object after detection by the access control device and the time of registration of the further identification object, an option menu showing data assigned to the identification object and further identification object in a similar fashion; and
   displaying, if a time interval between the time of registration of the identification object and the time of registration of the further identification object is exceeded, an option menu which displays data assigned to a last detected identification object in a secondary manner.

2. The method as claimed in claim 1, wherein a Radio Frequency Identification (RFID), chip is used as at least one of the identification object and the further identification object.

3. The method as claimed in claim 1, wherein a user profile of the user carrying the identification object is uploaded automatically in addition to releasing access to the data processing network.

4. The method as claimed in claim 1, wherein automatic monitoring of an activity pause time takes place during operation of the data processing network.

5. The method as claimed in claim 4, wherein an operating mode of the individual device switches to wait mode, as soon as the activity pause time exceeds a first limit value.

6. The method as claimed in claim 5, wherein, as soon as the activity pause time exceeds a second limit value, which indicates a time interval, which is longer than the time interval defined by the first limit value, the user is automatically logged off from the individual device.

7. The method as claimed in claim 6, wherein, when the user is logged off from the individual device, data is automatically backed up.

8. The method as claimed in claim 1, further comprising:
   monitoring, during operation of the data processing network, whether the identification object detected by the access control device is removed from a detection range of the access control device.

9. The method as claimed in claim 8, further comprising:
   measuring time elapsing after removal of the identification object from the detection range of the access control device.

10. The method as claimed in claim 1, further comprising:
generating, upon registration of the further identification object detected by the access control device, an option function that is displayable to the user.

11. A data processing network, comprising:
a plurality of interlinked individual devices, the data processing network configured for,
   permitting an identification object, carriable by a user of the data processing network, to exchange data in a wireless fashion with an access control device connected to at least one of the individual devices, upon the identification object being detected as being sufficiently close to the access control device;
   allowing the user access to the data processing network as a function of data stored on the identification object and transmitted, in the data exchange, to the one individual device;
   permitting a further identification object, of a further user of the data processing network detected by the access control device, to exchange data in a wireless fashion with the access control device, the identification object and further identification object being automatically assigned different usage rights as a function of an elapsed time between the detection of the identification object and the further identification object by the access control device;
   displaying, if a time interval is less than a time interval between a time of registration of the object after detection by the access control device and the time of registration of the further identification object, an option menu showing data assigned to the identification object and further identification object in a similar fashion; and
   displaying, if a time interval between the time of registration of the identification object and the time of registration of the further identification object is exceeded, an option menu which displays data assigned to a last detected identification object in a secondary manner.

12. The data processing network of claim 11, wherein the data is medical engineering data.

13. The data processing network of claim 12, wherein the medical engineering data includes image data.

14. The method as claimed in claim 2, wherein a user profile of the user carrying the identification object is uploaded automatically in addition to releasing access to the data processing network.

15. The method as claimed in claim 1, further comprising:
displaying, if a predetermined time interval between a time of registration of the identification object after detection by the access control device and the time of registration of the further identification object is exceeded, an option menu which displays data assigned to a last detected identification object in a secondary manner.

16. The method of claim 1, wherein the data is medical engineering data.

17. The method as claimed in claim 16, wherein the medical engineering data includes image data.

18. A non-transitory computer readable medium including program segments for, when executed on a computer device, causing the computer device to implement the method of claim 1.

19. A system, comprising:
   means for permitting an identification object, carriable by a user of a data processing network including a plurality of individual devices enabling user access, to exchange data in a wireless fashion with an access control device connected to at least one of the individual devices, upon the identification object being detected as being sufficiently close to the access control device;
   means for allowing the user access to the data processing network as a function of data stored on the identification object and transmitted, in the data exchange, to the one individual device;
   means for permitting a further identification object, of a further user of the data processing network detected by the access control device, to exchange data in a wireless fashion with the access control device, the identification object and further identification object being automatically assigned different usage rights as a function of an elapsed time between the detection of the identification object and the further identification object by the access control device;
   means for displaying, if a time interval is less than a time interval between a time of registration of the identification object after detection by the access control device and the time of registration of the further identification object, an option menu showing data assigned to the identification object and further identification object in a similar fashion; and
   means for displaying, if a time interval between the time of registration of the identification object and the time of registration of the further identification object is exceeded, an option menu which displays data assigned to a last detected identification object in a secondary manner.

* * * * *